(12) United States Patent
Melhem et al.

(10) Patent No.: US 8,393,314 B2
(45) Date of Patent: Mar. 12, 2013

(54) FLEX DUAL STAGE EGR COOLING

(75) Inventors: Bashar Melhem, Orland Park, IL (US);
Luis Carlos Cattani, Aurora, IL (US);
Martin Zielke, Homer Glen, IL (US);
Robert Rowells, Elmwood Park, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 629 days.

(21) Appl. No.: 12/577,522

(22) Filed: Oct. 12, 2009

(65) Prior Publication Data

US 2011/0083648 A1 Apr. 14, 2011

(51) Int. Cl.
*F02B 47/08* (2006.01)
*F02B 33/44* (2006.01)

(52) U.S. Cl. .......... 123/568.12; 701/108; 60/605.2

(58) Field of Classification Search .......... 123/41.31, 123/41.01, 41.02, 41.05, 41.08, 41.09, 41.1, 123/41.29, 41.3, 568.11, 568.12, 568.2, 568.21, 123/568.26, 568.31; 701/108, 113; 60/605.2, 60/278
See application file for complete search history.

(56) References Cited

U.S. PATENT DOCUMENTS

| | | | | |
|---|---|---|---|---|
| 4,325,219 A * | 4/1982 | Stang et al. | ............... | 60/599 |
| 8,028,523 B2 * | 10/2011 | Wikstrom et al. | ............ | 60/605.2 |
| 8,127,722 B2 * | 3/2012 | Justin et al. | ............... | 123/41.1 |
| 8,146,542 B2 * | 4/2012 | Cattani et al. | ............... | 123/41.29 |
| 2007/0245716 A1 * | 10/2007 | Kardos et al. | ............... | 60/278 |
| 2008/0190108 A1 * | 8/2008 | Eitel et al. | ............... | 60/605.2 |
| 2009/0314266 A1 * | 12/2009 | Hori et al. | ............... | 123/568.12 |
| 2010/0293943 A1 * | 11/2010 | Teng et al. | ............... | 60/602 |

* cited by examiner

*Primary Examiner* — Stephen K Cronin
*Assistant Examiner* — Raza Najmuddin
(74) *Attorney, Agent, or Firm* — Mark C. Bach; Jeffrey P. Calfa

(57) ABSTRACT

A circuit for cooling exhaust gas being recirculated through an EGR system (36) of an engine (10) from an exhaust system (20) successively through first and second heat exchangers (38, 40) to an intake system (16) for entrainment with intake air. Each heat exchanger has a respective coolant inlet through which liquid coolant enters and a respective coolant outlet through which liquid coolant exits after having absorbed heat from recirculated exhaust gas. The circuit has a third heat exchanger (32) to which coolant coming from the outlet of one of the first and second heat exchangers rejects heat, and parallel branches (84, 86) through which coolant enters the inlet of the other of the first and second heat exchangers. One of the parallel branches has a fourth heat exchanger (34) to which coolant flowing through that branch rejects heat, and one or more devices (50, 50A) for controlling the quantity of coolant flowing through each branch.

15 Claims, 1 Drawing Sheet

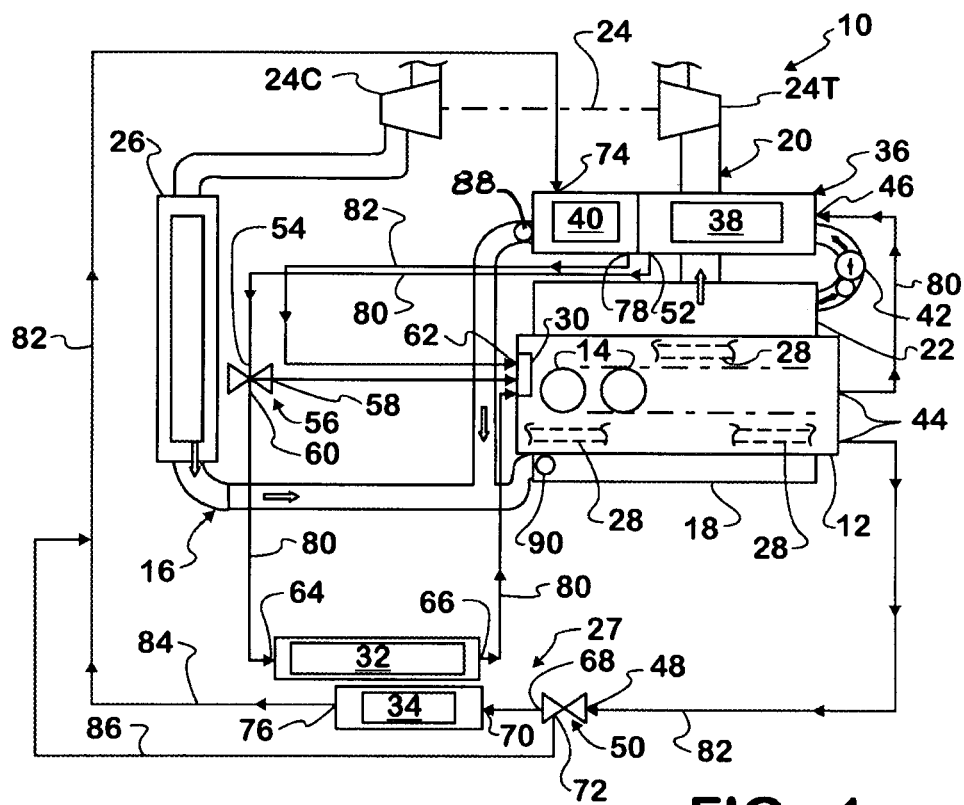
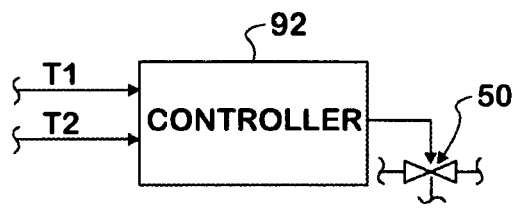
FIG. 2
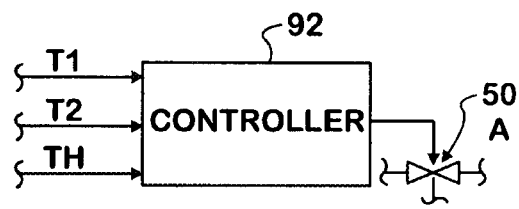
FIG. 3
FIG. 1

FLEX DUAL STAGE EGR COOLING

TECHNICAL FIELD

The technical field of this patent application concerns internal combustion engines, especially diesel engines in motor vehicles, that use exhaust gas recirculation (EGR) as a component of tailpipe emission control strategy.

BACKGROUND OF THE DISCLOSURE

A typical EGR system of an engine includes one or more EGR valves for controlling the flow of engine exhaust gas from the engine's exhaust system to the engine's intake system to meter an appropriate amount of exhaust gas into fresh air passing through the intake system where the air supports combustion of fuel in the engine's cylinders. The metered exhaust gas in effect dilutes the air so that in-cylinder temperature rise resulting from combustion is limited from that which would occur in the absence of such dilution. As a consequence, the quantity of oxides of nitrogen (NOx) in the exhaust gas that results from combustion is also limited.

Some EGR systems, especially those designed for compression ignition (i.e. diesel) engines, have one or more heat exchangers for cooling recirculated exhaust gas. Cooling of the exhaust gas can further limit the generation of NOx.

It is recognized in the industry that cooling of recirculated exhaust gas creates the potential for condensation of certain gaseous constituents of the exhaust gas. Over time such condensates may accumulate sufficiently to have a detrimental effect on performance and/or components. For example, coolant passageways in coolers may become restricted, components may corrode, and moving parts may stick.

Condensation may be more extreme and/or perhaps even unavoidable at certain times, such as when a cold-soaked engine is warming after having been started and portions of its EGR system have not yet reached operating temperature. When condensation occurs along an EGR flow path and temperature of surrounding parts is sufficiently low, condensate may freeze and consequently restrict, or even block, the flow until the parts warm sufficiently to thaw the frozen condensate.

To address such situations, known practices in EGR control strategies include delaying and/or limiting EGR under cold-start conditions. Although such measures may be helpful in slowing the accumulation of condensates as the engine ages, they do impact the quantity of NOx in tailpipe emissions.

SUMMARY OF THE DISCLOSURE

This disclosure concerns a system and method for two-stage cooling of recirculated engine exhaust gas by associating first and second heat exchangers in an EGR system (sometimes referred to as EGR coolers) with an engine's liquid cooling system. Respective coolant flow loops contain the respective EGR coolers. The coolers provide for hotter exhaust gas flowing through each to transfer heat to liquid coolant circulating in the respective loop. Coolant heat is rejected at third and fourth heat exchangers (more commonly referred to as radiators when the engine is the powerplant of a motor vehicle).

One of the loops contains a control valve that apportions flow to respective parallel branches of the loop, one of which contains one of the radiators. The control valve is controlled by temperatures at locations in the EGR system and the intake system to apportion the loop flow in a manner that provides temperature control of exhaust gas being recirculated. An example of temperature control is cooling exhaust gas being recirculated to an appropriately low temperature that minimizes or entirely avoids condensation of certain products of combustion in the exhaust gas.

One general aspect of the disclosure relates to an internal combustion engine comprising engine structure comprising engine cylinders within which combustion of fuel occurs to operate the engine and coolant passageways through which liquid coolant circulates to cool the engine structure, an intake system for conveying air to the engine cylinders to support the combustion of fuel, an exhaust system for conveying combustion-created exhaust gas from the cylinders, and an EGR system for recirculating some exhaust gas from the exhaust system successively through a first heat exchanger and a second heat exchanger to the intake system for entrainment with air being conveyed to the cylinders.

A cooling circuit circulates liquid coolant both in a first loop that comprises one of the heat exchangers through which exhaust gas recirculates, a third heat exchanger, and at least some of the coolant passageways in the engine structure, and in a second loop that comprises the other of the heat exchangers through which exhaust gas recirculates, a fourth heat exchanger, and at least some of the coolant passageways in the engine structure. The second loop comprises parallel branches, one of which includes the fourth heat exchanger, and one or more devices for controlling how much of the coolant circulating in the second loop flows through each branch.

Another general aspect of the disclosure relates to an internal combustion engine comprising engine structure comprising engine cylinders within which combustion of fuel occurs to operate the engine, an intake system for conveying air to the engine cylinders to support the combustion of fuel, an exhaust system for conveying combustion-created exhaust gas from the cylinders, and an EGR system for recirculating some exhaust gas from the exhaust system successively through a first heat exchanger and a second heat exchanger to the intake system for entrainment with air being conveyed to the cylinders.

A cooling circuit circulates liquid coolant through coolant passageways in the engine structure and externally of the engine structure both in a first loop that comprises the first heat exchanger, and a temperature-controlled valve that returns the coolant flow from the first heat exchanger to the engine structure when engine temperature is below some minimum temperature but diverts the flow to a third heat exchanger when engine temperature is higher than that minimum before returning the flow to the engine structure, and in a second loop that comprises a control valve, separate parallel branches from the control valve to the second heat exchanger, and a return from the second heat exchanger to the engine structure. One of the parallel branches includes the fourth heat exchanger, and the control valve is controlled to apportion coolant between the one branch and a second branch as a function of temperature at one or more locations in the engine.

Another general aspect of the disclosure relates to a method of cooling combustion-created exhaust gas being recirculated from an internal combustion engine exhaust system that conveys exhaust gas created by combustion of fuel in engine cylinders for operating the engine to an intake system of the engine through which air for supporting the combustion of fuel is delivered to the cylinders, thereby entraining the recirculated exhaust gas in the air, the engine having engine structure that contains both the cylinders and coolant passageways through which liquid coolant circulates to cool the engine structure.

The method comprises flowing the recirculated exhaust gas successively through a first heat exchanger and a second heat exchanger, circulating liquid coolant both in a first loop that comprises one of the heat exchangers through which recirculated exhaust gas flows, a third heat exchanger, and at least some of the coolant passageways in the engine structure, and in a second loop that comprises the other of the heat exchangers through which recirculated exhaust gas flows, a fourth heat exchanger, and at least some of the coolant passageways in the engine structure, including flowing coolant through parallel branches in the second loop, one of which includes the fourth heat exchanger, and controlling how much of the coolant circulating in the second loop flows through each branch.

Another general aspect of the disclosure relates to a method of cooling combustion-created exhaust gas being recirculated from an internal combustion engine exhaust system that conveys exhaust gas created by combustion of fuel in engine cylinders for operating the engine to an intake system of the engine through which air for supporting the combustion of fuel is delivered to the cylinders, thereby entraining the recirculated exhaust gas in the air, the engine having engine structure that contains both the cylinders and coolant passageways through which liquid coolant circulates to cool the engine structure.

The method comprises recirculating some exhaust gas from the exhaust system successively through a first heat exchanger and a second heat exchanger to the intake system for entrainment with air being conveyed to the cylinders, circulating liquid coolant through the coolant passageways in the engine structure and then externally of the engine structure both in a first loop that comprises the first heat exchanger, and a temperature-controlled valve that returns the coolant flow from the first heat exchanger to the engine structure when engine temperature is below some minimum temperature but diverts the flow to a third heat exchanger when engine temperature is higher than that minimum before returning the flow to the engine structure, and in a second loop that comprises a control valve, separate parallel branches, one of which includes the fourth heat exchanger, from the control valve to the second heat exchanger, and a return from the second heat exchanger to the engine structure, and controlling the control valve to apportion coolant between the one branch and a second branch as a function of temperature at one or more locations in the engine.

Another general aspect of the disclosure relates to a circuit for cooling exhaust gas being recirculated through an EGR system of an internal combustion engine from an exhaust system of the engine successively through a first heat exchanger and a second heat exchanger to an intake system of the engine for entrainment with air being conveyed to cylinders of the engine within which fuel is combusted to create the exhaust gas. Each heat exchanger comprises a respective coolant inlet through which liquid coolant enters and a respective coolant outlet through which liquid coolant exits after having absorbed heat from exhaust gas being recirculated. The circuit comprises a third heat exchanger to which coolant coming from the outlet of one of the first and second heat exchangers rejects heat, and parallel branches through which coolant enters the inlet of the other of the first and second heat exchangers, one of the parallel branches including a fourth heat exchanger to which coolant flowing through that one branch rejects heat, and one or more devices for controlling the quantity of coolant flowing through each branch.

Another general aspect of the disclosure relates to a method for cooling exhaust gas being recirculated through an EGR system of an internal combustion engine from an exhaust system of the engine successively through a first heat exchanger and a second heat exchanger to an intake system of the engine for entrainment with air being conveyed to cylinders of the engine within which fuel is combusted to create the exhaust gas. Each heat exchanger comprises a respective coolant inlet through which liquid coolant enters and a respective coolant outlet through which liquid coolant exits after having absorbed heat from exhaust gas being recirculated. The method comprises flowing coolant coming from the outlet of one of the first and second heat exchangers through a third heat exchanger to which the coolant rejects heat, and flowing coolant through parallel branches before entering the inlet of the other of the first and second heat exchangers, including flowing coolant through a fourth heat exchanger in one of the parallel branches to which coolant passing through that one branch rejects heat, and controlling the quantity of coolant flowing through each branch.

The foregoing summary, accompanied by further detail of the disclosure, will be presented in the Detailed Description below with reference to the following drawings that are part of this disclosure.

BRIEF DESCRIPTION OF THE DRAWINGS

FIG. 1 is a schematic diagram of a system for two-stage cooling of recirculated exhaust gas.

FIG. 2 is a general schematic diagram of a control strategy for the system shown in FIG. 1.

FIG. 3 is a general schematic diagram of a control strategy for a modified form of system.

DETAILED DESCRIPTION

A diesel engine 10, like the one shown in FIG. 1, comprises structure 12 containing engine cylinders 14 within which combustion of fuel occurs to operate the engine, such structure typically comprising a block, a crankcase, and one or more cylinder heads depending on the particular engine configuration. Engine 10 also comprises an air intake system 16, including an intake manifold 18, for conveying fresh air to cylinders 14 to support the combustion of fuel, and an exhaust system 20, including an exhaust manifold 22 for conveying combustion-created exhaust gas from the cylinders.

Engine 10 also comprises a turbocharger 24 having a turbine 24T operated by exhaust gas passing through exhaust system 20 to operate a compressor 24C that draws fresh air into intake system 16 to create charge air for the engine. Because the compression of the air elevates its temperature, the compressed air flows through a charge air cooler 26 where some of the heat is rejected before the charge air enters cylinders 14.

Engine 10 comprises a liquid cooling system 27 that includes a system of coolant passageways 28 in structure 12 through which coolant is circulated by a pump 30, which by way of example is an engine-driven coolant pump. The circulating coolant absorbs engine heat as it passes through the system of passageways and rejects absorbed heat at radiators 32, 34. When engine 10 is the powerplant of a motor vehicle such as a large truck, radiators 32, 34 are typically liquid-toair heat exchangers through which ambient air can flow by ram air effect and/or by a fan or fans pulling or pushing air through them.

Engine 10 also comprises an EGR system 36 for recirculating some exhaust gas from exhaust system 20 successively through a first heat exchanger 38 and a second heat exchanger 40 to intake system 16 for entrainment with the charge air flow to cylinders 14. An EGR valve 42 controls the recirculation flow entering heat exchanger 38 from exhaust manifold 22.

Heat exchangers 38 and 40 are associated with cooling system 27 in the following manner.

A coolant outlet 44 in structure 12, which may physically comprise one or more ports or points of connection for external conduits such as the two commonly marked in FIG. 1, is in fluid communication with an inlet 46 of heat exchanger 38 and in fluid communication with an inlet 48 of a coolant control valve 50.

Heat exchanger 38 has an outlet 52 that is in fluid communication with an inlet 54 of a temperature-controlled valve 56, such as a thermostat. Valve 56 comprises two outlets 58, 60. Outlet 58 is in fluid communication with an inlet 62 of pump 30, and outlet 60 is in fluid communication with an inlet 64 of radiator 32. Radiator 32 has an outlet 66 in fluid communication with pump inlet 62.

Coolant control valve 48 comprises an outlet 68 that is in fluid communication with an inlet 70 of radiator 34 and an outlet 72 that is in fluid communication with an inlet 74 of heat exchanger 40. Radiator 34 has an outlet 76 that is in fluid communication with inlet 74. Heat exchanger 40 has an outlet 78 that is in fluid communication with pump inlet 62.

When engine 10 is running and has attained operating temperature, pump 30 is circulating coolant in a first loop 80 that comprises heat exchanger 38, heat exchanger 32, and at least some of the coolant passageways 28 in engine structure 12. Pump 30 is also circulating coolant in a second loop 82 that comprises heat exchanger 34, heat exchanger 40, and at least some coolant passageways 28. Prior to engine 10 attaining some minimum temperature that may be slightly less than operating temperature, valve 56 was disallowing coolant that had flowed through heat exchanger 38 to flow to heat exchanger 32, but once that temperature was exceeded, valve 56 diverted the flow to heat exchanger 32.

Between control valve 50 and heat exchanger 40, loop 82 has two parallel branches 84, 86. Branch 84 contains heat exchanger 34. Control valve 50 apportions coolant circulating in loop 82 between the two branches, but the apportioned flows merge so that the entire flow entering valve 50 eventually enters heat exchanger 40.

Valve 50 is controlled to apportion the flows through the respective branches as a function of temperature at one or more locations in the engine. FIG. 1 shows two such locations, one location 88 being in EGR system 36 between heat exchanger 40 and intake system 16, and another location 90 being in intake system 16 after recirculated exhaust gas has entrained with the charge air.

FIG. 2 shows the general control strategy that has been described above in detail. The measured temperatures, generally designated T1, T2 are inputs to a controller 92 that controls an actuator of valve 50 in accordance with a control strategy in controller 92. Measurement of the temperatures may be made by devoted sensors and/or inferred or estimated from data from other sources.

Any of various control strategies may be used. Different strategies may be used for different engines and ambient conditions. Any given control strategy may use inputs additional to, or even other than, the ones that have been specifically mentioned, because any particular control strategy will depend on the particular engine and on the particular objective to be achieved by control of valve 50.

One representative strategy comprises apportioning the branch flows to cooling exhaust gas being recirculated to an appropriately low temperature that minimizes or entirely avoids condensation of certain products of combustion in the exhaust gas.

FIG. 3 shows another general control strategy for a system like that in FIG. 1 but having a coolant control valve 50A substituted for valve 50. Valve 50A is like valve 50 in that it can apportion flow between branches 84, 86, but it differs in that it can also throttle the flows. An exemplary embodiment of valve 50A comprises two actuators, one for controlling an apportioning valve element to apportion flow between branches 84, 86, and another for controlling a throttle valve element upstream of the apportioning valve element for throttling flow before it is subsequently apportioned.

The actuator that controls the throttle valve element is controlled by one portion of controller 92 while the apportioning valve element is controlled by another portion. There are several possible strategies for controlling the respective valve elements. The strategies can be coordinated within controller 92 using temperatures T1, T2. Alternately they can be coordinated within controller 92 still using temperatures T1, T2, but with an additional throttle input TH for throttle control.

As far as physical construction is concerned, the two functions of throttling and apportioning can be integrated in a single assembly, as suggested by FIG. 3, or they can be separate assemblies. With the throttling function being performed upstream of the apportioning function, throttling will affect flows in both branches when the flow is being apportioned. Instead of throttling flow before apportioning it, throttling could instead be performed in either or both branches after being apportioned.

What is claimed is:

1. A method of cooling combustion-created exhaust gas being recirculated in an internal combustion engine from an exhaust system that conveys exhaust gas created by combustion of fuel in engine cylinders to an intake system through which air for supporting the combustion of fuel is delivered to the engine cylinders, thereby entraining the recirculated exhaust gas in the air, the engine having engine structure that contains both the engine cylinders and coolant passageways through which liquid coolant circulates to cool the engine structure, the method comprising:

flowing exhaust gas which is being recirculated successively through a first heat exchanger and a second heat exchanger;

circulating liquid coolant both in a first loop that comprises a) one of the first and second heat exchangers, b) a third heat exchanger, and c) at least some of the coolant passageways in the engine structure, and in a second loop that comprises d) the other of the first and second heat exchangers, e) first and second branches in parallel flow relation with each other, the first branch comprising a fourth heat exchanger, and f) at least some of the coolant passageways in the engine structure, and controlling how much of the coolant circulating in the second loop is apportioned to the first branch and to the second branch.

2. A method as set forth in claim 1 comprising circulating coolant in the first loop through at least some of the coolant passageways to an exit through which coolant leaves the engine structure, then successively through the first heat exchanger and the third heat exchanger in that order, and ultimately to an entrance for at least some of the coolant passageways.

3. A method as set forth in claim 1 comprising circulating coolant in the second loop through at least some of the coolant passageways to an exit through which coolant leaves the engine structure, then successively through the first and second branches and through the second heat exchanger in that order, and ultimately to an entrance for at least some of the coolant passageways.

4. A method as set forth in claim 1 comprising circulating coolant in the first loop successively through the first heat exchanger and the third heat exchanger in that order, and circulating coolant in the second loop successively through the first and second branches and through the second heat exchanger in that order, and controlling how much of the coolant circulating in the second loop is apportioned to the first branch and to the second branch by operating a control valve to apportion coolant circulating in the second loop to the first branch and to the second branch.

5. A method as set forth in claim 4 including flowing coolant leaving the second branch and coolant leaving the first branch confluently through the second heat exchanger.

6. A method as set forth in claim 4 in which the step of operating a control valve comprises operating the control valve to apportion coolant circulating in the second loop to the first branch and to the second branch as a function of temperature at one or more locations in the engine.

7. A method as set forth in claim 6 including measuring temperature at one or more locations that include a location of recirculated exhaust gas flow between the second heat exchanger and the intake system and a location of entrained air and recirculated exhaust gas flow through the intake system, and using the measured temperatures to operate the control valve.

8. A method of cooling combustion-created exhaust gas being recirculated in an internal combustion engine from an exhaust system that conveys exhaust gas created by combustion of fuel in engine cylinders to an intake system through which air for supporting the combustion of fuel is delivered to the engine cylinders, thereby entraining the recirculated exhaust gas in the air, the engine having engine structure that contains both the engine cylinders and coolant passageways through which liquid coolant circulates to cool the engine structure, the method comprising:

recirculating some exhaust gas from the exhaust system successively through a first heat exchanger and a second heat exchanger to the intake system for entrainment with air being conveyed to the engine cylinders;

circulating liquid coolant through the coolant passageways in the engine structure and then externally of the engine structure through a first coolant path which, with coolant passageways in the engine structure, forms a first loop and through a second coolant path which, with coolant passageways in the engine structure, forms a second loop, the first coolant path comprising the first heat exchanger and a temperature-controlled valve that returns coolant from the first heat exchanger to the engine structure when engine temperature is below some minimum temperature but diverts coolant to a third heat exchanger when engine temperature is higher than that minimum temperature before returning the coolant to the engine structure, and the second loop comprising a control valve, first and second branches which are in parallel flow relation with each other from the control valve to the second heat exchanger and one of which includes the fourth heat exchanger, and a return from the second heat exchanger to the engine structure; and controlling the control valve to apportion coolant between the first branch and the second branch as a function of temperature at one or more locations in the engine.

9. A method as set forth in claim 8 including measuring temperature at one or more locations that include a location of recirculated exhaust gas flow between the second heat exchanger and the intake system and a location of entrained air and recirculated exhaust gas flow through the intake system, and using the measured temperatures to control the control valve.

10. A method for cooling exhaust gas being recirculated through an EGR system of an internal combustion engine from an exhaust system of the engine successively through a first heat exchanger and a second heat exchanger to an intake system of the engine for entrainment with air being conveyed to cylinders of the engine within which fuel is combusted to create the exhaust gas, each heat exchanger comprising a respective coolant inlet through which liquid coolant enters and a respective coolant outlet through which liquid coolant exits after having absorbed heat from exhaust gas being recirculated, the method comprising flowing coolant coming from the outlet of one of the first and second heat exchangers through a third heat exchanger to which the coolant rejects heat, and flowing coolant through parallel branches before entering the inlet of the other of the first and second heat exchangers, including flowing coolant through a fourth heat exchanger in one of the parallel branches to which coolant passing through that one branch rejects heat, and controlling the quantity of coolant flowing through each branch.

11. A method as set forth in claim 10 in which the step of flowing coolant coming from the outlet of one of the first and second heat exchangers through a third heat exchanger at which the coolant rejects heat comprises flowing coolant coming from the outlet of the first heat exchanger through the third heat exchanger.

12. A method as set forth in claim 10 in which the step of controlling the quantity of coolant flowing through each branch comprises controlling operation of a control valve to apportion coolant flow between a first branch and a second branch.

13. A method as set forth in claim 12 including controlling operation of the control valve to apportion coolant flow between the first branch and the second branch as a function of temperature at one or more locations in the engine.

14. A method as set forth in claim 13 including measuring temperature at one or more locations in the engine that include a location of recirculated exhaust gas flow between the second heat exchanger and the intake system and a location of entrained air and recirculated exhaust gas flow through the intake system, and using the measured temperatures to control operation of the control valve.

15. A method as set forth in claim 10 in which the step of controlling the quantity of coolant flowing through each branch comprises controlling operation of a respective valve element to apportion coolant flow between a first branch and a second branch and to throttle flow through one or both of the first branch and the second branch.

* * * * *